United States Patent Office

3,697,254
Patented Oct. 10, 1972

3,697,254
DECAFLUOROBENZHYDROL AS A SELECTIVE
HERBICIDE
David Thomas Saggers, Saffron Walden, England, assignor to Fisons Pest Control Limited, Harston, Cambridgeshire, England
No Drawing. Filed May 6, 1968, Ser. No. 727,033
Claims priority, application, Great Britain, May 16, 1967, 22,558/67
Int. Cl. A01n 9/24
U.S. Cl. 71—122                              3 Claims

ABSTRACT OF THE DISCLOSURE

Decafluorobenzhydrol possesses herbicidal activity and is particularly useful as a selective herbicide, especially for the selective control of crabgrass.

---

The present invention relates to a new herbicide.

It has been found that decafluorobenzhydrol, which is of the formula:

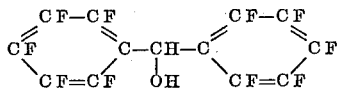

possesses herbicidal activity and is particularly useful as a selective herbicide.

Accordingly the present invention is for a herbicidal composition which contains as an active ingredient decafluorobenzhydrol.

The herbicidal composition suitably contains other components such as wetting agents, carriers, solid diluents and the like.

The present invention is also for the treatment of plants or the soil for the control of plant growth which comprises applying thereon or thereto a composition as identified above.

The compound decafluorobenzyhydrol is generally useful as a herbicide, and is particularly useful in the control of crabgrass (*Digitari sanguinalis*), and can be used for the selective control of crabgrass, for example in turf, or in cereal crops.

The decafluorobenzhydrol is a solid, melting point 79–80° C., and can be formulated in any of the conventional ways. Thus for example the decafluorobenzhydrol may be dissolved or dispersed in an organic solvent, such as a hydrocarbon oil or a polyethylene glycol, with or without a wetting agent. Alternatively the decafluorobenzhydrol may be dissolved or dispersed in a water immiscible solvent, suitably containing dissolved emulsifying agents, so as to form a self-emulsifiable oil on addition to water.

Alternatively the decafluorobenzhydrol may be formulated with a solid carrier so as to form a solid preparation. Suitable solid carriers include clays, sands, talc, mica, fertilizers and the like. The decafluorobenzhydrol may be admixed with the carrier in powder or small granule form and the mixture used as such or granulated, possibly using a granulating agent, to form a granular product. Such solid preparations may, in some cases, also include wetting agents, and may be in the form of a wettable powder.

The wetting agents used may comprise anionic compounds such as for example soaps, fatty sulphate esters such as dodecyl sodium sulphate, octadecyl sodium sulphate and cetyl sodium sulphate, fatty aromatic sulphonate such as alkylbenzene sulphonates or butyl naphthalene sulphonate, more complex fatty sulphonates such as the amide condensation product of oleic acid and N-methyl taurine or the sodium sulphonate or dioctyl succinate.

The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The compositions according to the present invention may contain in addition to the decafluorobenzhydrol a second plant growth substance or herbicide. It is advantageous for herbicidal use for the decafluorobenzhydrol to be used in association with second herbicide.

The second herbicide may be for example a phenoxyaliphatic acid, or a substituted urea or a triazine. In respect of selective herbicidal compositions for post-emergence use, the second herbicide is suitably a substituted phenoxyaliphatic acid.

In such mixtures, the phenoxyaliphatic acid generally comprises an alkyl and/or halogen substituted phenoxyaliphatic acid, and their salts, for example alkali metal, amine and alkanolamine salts, and functional derivatives, for example esters and amides. These compounds may be of activity such that they are recognised as commercial herbicides, or may be of only slight herbicidal activity. Examples of the substituted phenoxyaliphatic acids which may be mentioned include 2,4-dichlorophenoxyacetic acid, 2-methyl-4-chlorophenoxyacetic acid; 2,4,5-trichlorophenoxyacetic acid, gamma-2,4-dichloro-phenoxybutyric acid, gamma-2-methyl-4-chloro-phenoxy-butyric acid, alpha-2-methyl-4-chlorophenoxypropionic acid.

A further embodiment of the invention comprises a process for the control of weeds, which comprises the use of a mixture of the decafluorobenzhydrol and a second herbicide.

The ratio of the decafluorobenzhydrol to the second herbicide may vary over a wide range according to the particular compounds involved and the intended use. In general the ratio of decafluorobenzhydrol to second herbicide lies in the range 1:0.1 to 1:15.

These mixtures are of particular value in the control of weeds, and may be more effective and economical than the components used alone. In some cases synergism is observed. Mixtures of decafluorobenzhydrol and phenoxyaliphatic herbicide are particularly useful for the control of weeds in turf.

For total herbicidal use the decafluorobenzhydrol may be used at rates of 1 to 20 pounds per acre; for selective herbicidal use the decafluorobenzhydrol may be used at rates of 4 ounces to 10 pounds, and preferably 1 to 4 pounds, per acre.

The following examples are given to illustrate the present invention. Parts and percentages are by weight unless otherwise indicated.

EXAMPLE 1

Peas, mustard, linseed, maize, ryegrass and oats seeds were sown in John Innes No. 1 potting compost in which decafluorobenzhydrol had been incorporated at a rate equivalent to 120 parts per million weight/volume of decafluorobenzhydrol to soil. The plants were grown in aluminium pans, 7½ inches x 3¾ inches x 2 inches, one species to a pan. After 21 days growth in a controlled environment room the plants were assessed visually for any herbicidal effects on a 0–100 scale in which 0 signifies no herbicidal effect and 100 signifies complete suppression of the plants. Results are tabulated as follows:

| Species: | Herbicidal effect |
|---|---|
| Peas | 0 |
| Mustard | 0 |
| Linseed | 57 |
| Maize | 100 |
| Ryegrass | 100 |
| Oats | 85 |

EXAMPLE 2

Seeds of crabgrass, barnyardgrass, blackgrass, wheat, barley and oats were sown in John Innes No. 1 potting compost in aluminium pans, 7½ inches x 3¾ inches x 2 inches, one species to a pan. After three hours they were sprayed with aqueous acetone solutions of decafluorobenzhydrol at rates equivalent to 2 and 1 lbs./acre. After 21 days growth in a controlled environment room the plants were assessed visually for any herbicidal effects on a 0–100 scale in which 0 signifies no herbicidal effect and 100 signifies complete suppression of the plants. Results are tabulated below:

| Species | Herbicidal effect | |
|---|---|---|
| | 2 lb./acre | 1 lb./acre |
| Crabgrass | 98 | 50 |
| Barnyardgrass | 40 | 0 |
| Blackgrass | 0 | 0 |
| Wheat | 0 | 0 |
| Barley | 0 | 0 |
| Oats | 0 | 0 |

I claim:
1. A process for the treatment of plants and the soil to combat weeds which comprises applying thereto a weed-combatting amount of decafluorobenzhydrol.
2. A process for the treatment of turf or soil in which turf is to grow, to selectively combat crabgrass, which comprises applying to the turf or soil a crabgrass-combatting amount of decafluorobenzhydrol.
3. A process for the treatment of turf to selectively combat crabgrass which comprises applying to the turf a crabgrass-combatting amount of decafluorobenzhydrol.

References Cited
UNITED STATES PATENTS 2,396,513  3/1946  Jones _____ 71—116

OTHER REFERENCES

Vorozhtsov, Jr.: "Decafluorodiphenylmethane and its Derivatives," Chem. Abs., vol. 64, 12586e (1966).

Buxton et al.: "Pentafluorophenyl Substituted Alcohols," Chem. Abs., vol. 62, 16125f (1965).

Poignant et al.: "The Comparative Herbicidal Activity of Some Fatty Acids and Halogenated Aliphatic Alcohols," Chem. Abs., vol. 54, 21603b (1960).

LEWIS GOTTS, Primary Examiner

C. L. MILLS, Assistant Examiner

U.S. Cl. X.R.

71—93, 108, 109, 110, 116, 117, 118, 119; 260—618 B